United States Patent
Kishiyama et al.

(10) Patent No.: US 9,918,272 B2
(45) Date of Patent: Mar. 13, 2018

(54) COMMUNICATION SYSTEM, MOBILE TERMINAL APPARATUS, LOCAL AREA BASE STATION APPARATUS AND COMMUNICATION METHOD

(71) Applicant: NTT DOCOMO, INC., Tokyo (JP)

(72) Inventors: Yoshihisa Kishiyama, Tokyo (JP); Anass Benjebbour, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/390,093

(22) PCT Filed: Apr. 3, 2013

(86) PCT No.: PCT/JP2013/060198
§ 371 (c)(1),
(2) Date: Oct. 2, 2014

(87) PCT Pub. No.: WO2013/151090
PCT Pub. Date: Oct. 10, 2013

(65) Prior Publication Data
US 2015/0334639 A1    Nov. 19, 2015

(30) Foreign Application Priority Data
Apr. 6, 2012    (JP) .................................. 2012-087585

(51) Int. Cl.
*H04Q 7/10*        (2006.01)
*H04W 48/16*    (2009.01)
(Continued)

(52) U.S. Cl.
CPC ........... *H04W 48/16* (2013.01); *H04W 24/10* (2013.01); *H04W 48/08* (2013.01); *H04W 76/023* (2013.01); *H04W 24/02* (2013.01)

(58) Field of Classification Search
CPC ... H04W 64/00; H04W 48/10; H04W 84/045; H04W 84/10; H04W 40/00; H04W 48/18; H04W 76/00; H04W 52/0206; H04W 4/00
(Continued)

(56) References Cited

U.S. PATENT DOCUMENTS 8,289,913 B2 * 10/2012 Kato ...................... H04W 8/26
                                                        370/329
8,655,347 B2 *  2/2014 Lee ...................... H04W 24/10
                                                        455/161.3
(Continued)

FOREIGN PATENT DOCUMENTS

JP    2011-238992 A    11/2011
JP    2013-522987 A     6/2013
(Continued)

OTHER PUBLICATIONS

International Search Report issued in PCT/JP2013/060198 dated Jun. 18, 2013 (1 page).
(Continued)

*Primary Examiner* — Kathy Wang-Hurst
*Assistant Examiner* — Julio Perez
(74) *Attorney, Agent, or Firm* — Osha Liang LLP

(57) ABSTRACT

The present invention is designed to provide highly efficient local area radio access. A communication system, in which a mobile terminal apparatus (10) detects a local area base station apparatus (30) to connect to, among local area base station apparatuses (30), is configured such that the local area base station apparatuses (30) transmit detection signals to be used to detect the local area base station apparatus (30), to the mobile terminal apparatus (10), in a radio communication scheme for the local areas, which is different from the radio communication scheme for the wide area, and the
(Continued)

mobile terminal apparatus (10) transmits detection signal measurement results to the local area base station apparatus (30), through an uplink channel that is defined in the radio communication scheme for the local areas.

15 Claims, 14 Drawing Sheets

(51) Int. Cl.
*H04W 76/02* (2009.01)
*H04W 24/10* (2009.01)
*H04W 48/08* (2009.01)
*H04W 24/02* (2009.01)

(58) Field of Classification Search
USPC ............ 455/456.1, 449, 456.2; 370/328, 329
See application file for complete search history.

(56) References Cited

U.S. PATENT DOCUMENTS

| | | | |
|---|---|---|---|
| 8,818,443 B2* | 8/2014 | Yamamoto | H04W 52/283 370/318 |
| 2009/0219873 A1* | 9/2009 | Higuchi | H04J 13/00 370/329 |
| 2009/0291690 A1* | 11/2009 | Guvenc | H04W 16/10 455/444 |
| 2010/0056177 A1* | 3/2010 | Kojima | H04W 64/00 455/456.1 |
| 2010/0227627 A1* | 9/2010 | Ishii | H04W 60/04 455/456.2 |
| 2011/0019648 A1 | 1/2011 | Huang et al. | |
| 2011/0170481 A1 | 7/2011 | Gomes et al. | |
| 2011/0194493 A1* | 8/2011 | Centonza | H04W 52/0206 370/328 |
| 2011/0281590 A1* | 11/2011 | Frederiksen | H04W 24/02 455/449 |
| 2012/0094663 A1* | 4/2012 | Awoniyi | H04W 48/16 455/434 |
| 2013/0005388 A1* | 1/2013 | Naka | H04W 52/244 455/522 |
| 2013/0012188 A1 | 1/2013 | Gao et al. | |
| 2013/0065600 A1 | 3/2013 | Lim | |
| 2013/0136029 A1 | 5/2013 | Matsuo et al. | |
| 2013/0178201 A1 | 7/2013 | Hapsari et al. | |

FOREIGN PATENT DOCUMENTS

| | | |
|---|---|---|
| WO | 2009/116614 A1 | 9/2009 |
| WO | 2011/120379 A1 | 10/2011 |
| WO | 2011126186 A1 | 10/2011 |
| WO | 2012/029237 A1 | 3/2012 |

OTHER PUBLICATIONS

3GPP TR 25.913 V9.0.0; "3rd Generation Partnership Project; Technical Specification Group Radio Access Network; Requirements for Evolved UTRA (E-UTRA) and Evolved UTRAN (E-UTRAN) (Release 9)"; Dec. 2009 (18 pages).
NTT DOCOMO; "Enhanced Cell Identification for Additional Carrier Type"; 3GPP TSG RAN WG1 Meeting #68, R1-120398; Dresden, Germany; Feb. 6-10, 2012 (4 pages).
Notification of Reasons for Rejection issued in the counterpart Japanese Patent Application No. 2012-087585, dated Feb. 2, 2016 (5 pages).
Office Action dated Jul. 5, 2016, in corresponding Japanese Application No. 2012-087585 (with translation) (6 pages).
Extended European Search Report issued in the counterpart European Patent Application No. 13772106.4, dated Nov. 23, 2015 (10 pages).
Office Action issued in the counterpart Chinese Patent Application No. 201380018127.X, dated Jul. 19, 2017 (12 pages).

* cited by examiner

|  | WIDE AREA | LOCAL AREA |
|---|---|---|
| SPECTRUM EFFICIENCY | VERY IMPORTANT (LIMITED BW) | IMPORTANT (MAY NOT BE CRITICAL IF LARGE BW AVAILABLE) |
| MOBILITY | MEDIUM-TO-HIGH | LOW |
| COVERAGE | ESSENTIAL | WIDER IS BETTER |
| DL/UL RADIO LINKS | ASYMMETRIC | MORE SYMMETRIC |
| TRAFFIC LOAD | MORE UNIFORM (MANY USERS & CELL PLANNING) | MORE FLUCTUATED (LESS USERS & NON-UNIFORM DEPLOYMENTS) |

FIG.4

COMMUNICATION SYSTEM, MOBILE TERMINAL APPARATUS, LOCAL AREA BASE STATION APPARATUS AND COMMUNICATION METHOD

TECHNICAL FIELD

The present invention relates to a communication system, a mobile terminal apparatus, a local area base station apparatus and a communication method in a next-generation mobile communication system.

BACKGROUND ART

In a UMTS (Universal Mobile Telecommunications System) network, long-term evolution (LTE) is under study for the purposes of further increasing high-speed data rates, providing low delay, and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Furthermore, successor systems of LTE are also under study for the purpose of achieving further broadbandization and higher speed beyond LTE (referred to as, for example, "LTE-advanced" or "LTE enhancement" (hereinafter referred to as "LTE-A")). In LTE-A (Rel-10), carrier aggregation to make a broad band by grouping a plurality of component carriers (CCs), where the system band of the LTE system is one unit, is used. Also, in LTE-A, a HetNet (Heterogeneous Network) configuration to use an interference coordination technique (eICIC: enhanced Inter-Cell Interference Coordination) is under study.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

Now, in cellular systems such as W-CDMA, LTE (Rel. 8), and successor systems of LTE (for example, Rel. 9 and Rel. 10), the radio communication schemes (radio interfaces) are designed to support wide areas. In the future, it is expected that high-speed wireless services by means of near-field communication supporting local areas such as, indoors, shopping malls and so on, in addition to cellular environment such as given above, will be provided. Consequently, there is a demand to design new radio communication schemes that are specifically designed for local areas, so that capacity can be secured with local areas while coverage is secured with a wide area.

The present invention has been made in view of the above, and it is therefore an object of the present invention to provide a communication system, a mobile terminal apparatus, a local area base station apparatus, and a communication method that can provide highly efficient local area radio access.

Solution to Problem

The communication system of the present invention is a communication system, in which a mobile terminal apparatus that can communicate with a wide area base station apparatus covering a wide area in a radio communication scheme for the wide area detects a local area base station apparatus which the mobile terminal apparatus will connect to, among local area base station apparatuses covering local areas, and, in this communication system, the local area base station apparatuses transmit detection signals to be used to detect the local area base station apparatus, to the mobile terminal apparatus, in a radio communication scheme for the local areas, which is different from the radio communication scheme for the wide area, and the mobile terminal apparatus transmits measurement results of the detection signals to a local area base station apparatus through an uplink channel that is defined in the radio communication scheme for the local areas.

Technical Advantage of the Invention

According to the present invention, detection signal measurement results are reported to a local area base station apparatus quickly through an uplink channel defined in the radio communication scheme for local areas. Consequently, when traffic is produced in a mobile terminal apparatus, it is possible to execute subsequent initial connection on the uplink smoothly. As a result, it is possible to provide highly efficient local area radio access that is specifically designed for local areas.

BRIEF DESCRIPTION OF DRAWINGS

FIG. 4 shows a table to list differences between a wide area and a local area;

DESCRIPTION OF EMBODIMENTS

Figure 1:
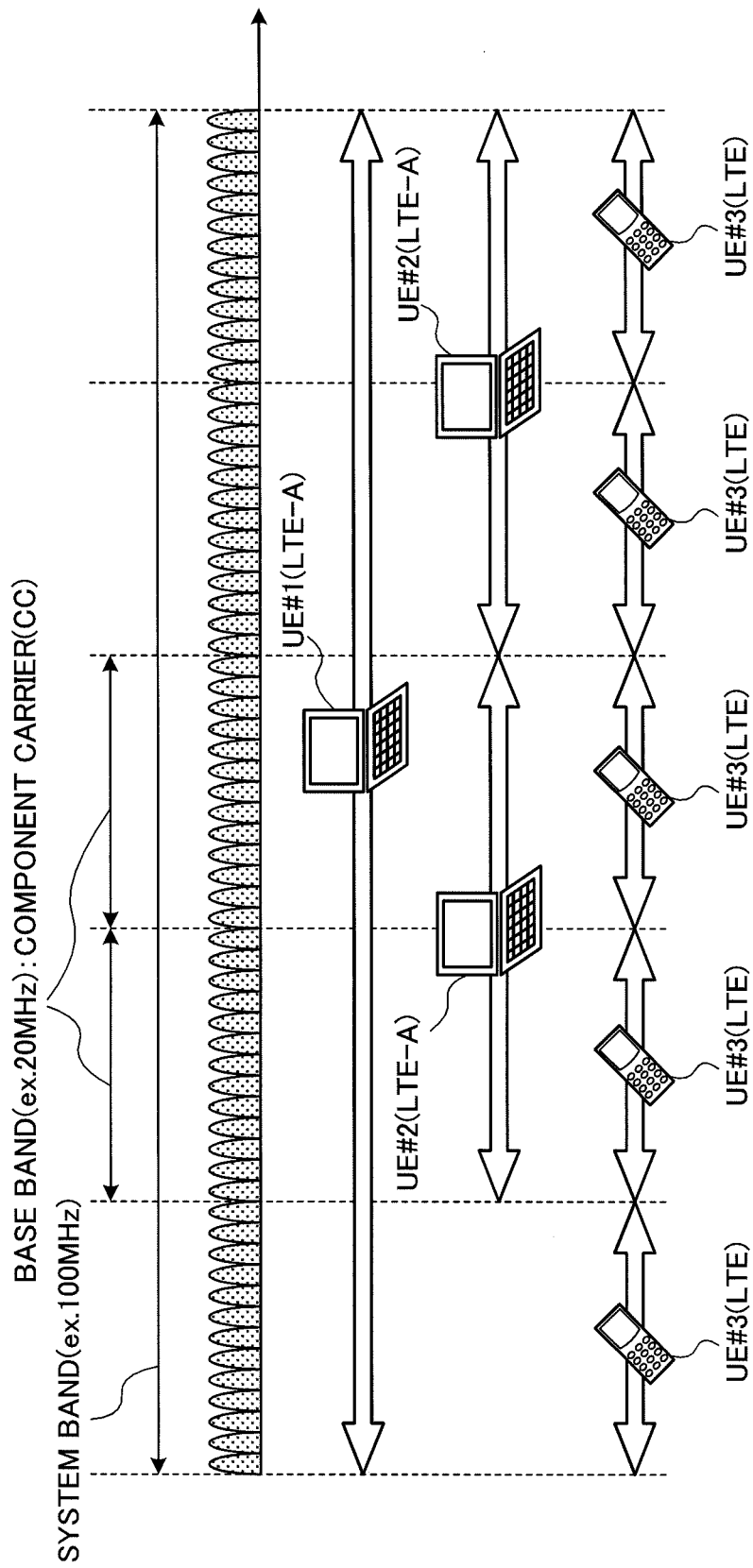
FIG. 1 is a diagram to explain a system band in an LTE system.

FIG. 1 is a diagram to show a layered bandwidth configuration defined in LTE-A. The example shown in FIG. 1 is a layered bandwidth configuration that is assumed when an LTE-A system having a first system band formed with a plurality of fundamental frequency blocks (hereinafter referred to as "component carriers"), and an LTE system having a second system band formed with one component carrier, coexist. In the LTE-A system, for example, radio communication is performed in a variable system bandwidth of 100 MHz or below, and, in the LTE system, for example, radio communication is performed in a variable system bandwidth of 20 MHz or below. The system band of the LTE-A system includes at least one component carrier, where the system band of the LTE system is one unit. Widening the band by way of gathering a plurality of component carriers in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, mobile terminal apparatus UE (User Equipment) #1 is a mobile terminal apparatus to support the LTE-A system (and also support the LTE system), and is able to support a system band up to 100 MHz. UE #2 is a mobile terminal apparatus to support the LTE-A system (and also support the LTE system), and is able to support a system band up to 40 MHz (20 MHz×2=40 MHz). UE #3 is a mobile terminal apparatus to support the LTE system (and not support the LTE-A system), and is able to support a system band up to 20 MHz (base band).

Figure 2:
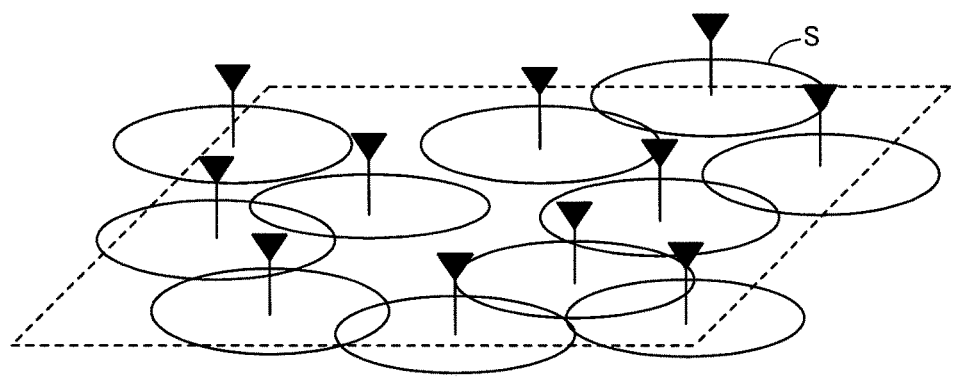
FIG. 2 is a diagram to show a configuration to arrange many small cells in a macro cell.

Now, future systems may anticipate a configuration to arrange numerous small cell S's in a macro cell, just as shown in FIG. 2. In this case, the small cell S's need to be designed taking into account capacity versus network costs. The network costs may include, for example, the cost of installing the network nodes, backhaul link and so on, the operation cost for cell planning and maintenance support, the power consumption on the network side, and so on. Also, as demands apart from capacity, small cell S's are required to support saved power consumption on the mobile terminal apparatus side, random cell planning, and so on.

Figure 3A:
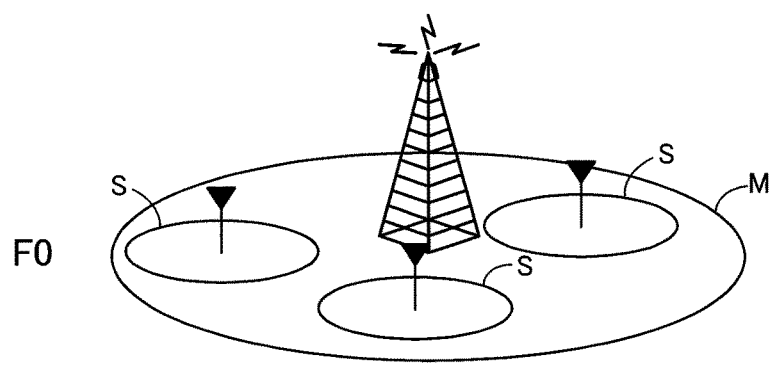
FIG. 3 provides diagrams to show two kinds of heterogeneous network configurations.
Figure 3B:
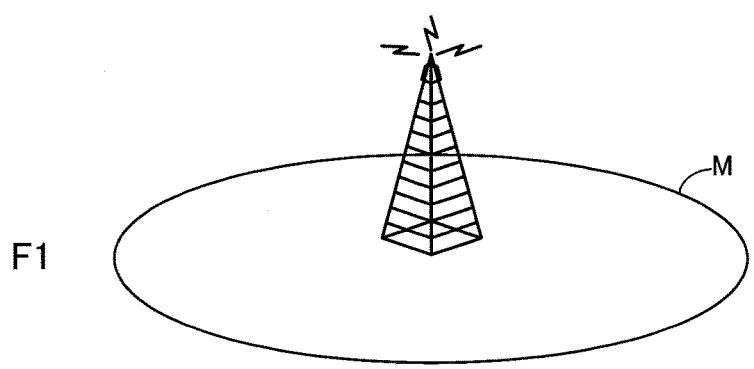
Figure 3B:
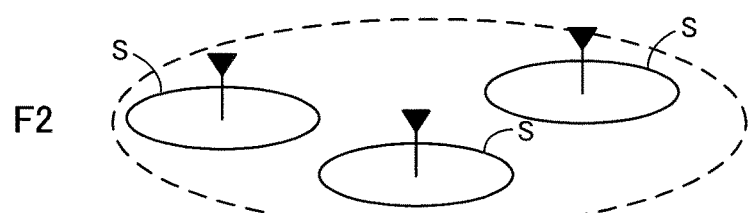

When small cell S's are arranged in a macro cell M, two kinds of heterogeneous network (hereinafter referred to as "HetNet") configurations may be possible, as shown in FIGS. 3A and 3B. In the first HetNet configuration shown in FIG. 3A, the small cells are arranged such that the macro cell M and the small cell S's use the same carrier. In the second HetNet configuration shown in FIG. 3B, the small cell S's are arranged such that the macro cell M and the small cell S's use different carriers. In the second HetNet configuration, the small cell S's use a dedicated carrier, so that it is possible to secure coverage with the macro cell M and secure capacity with the small cell S's. It is expected that, in the future (Rel. 12 and later versions), this second HetNet configuration will become more important.

As shown in FIG. 4, in the second HetNet configuration, varying demands and differences in configuration may exist between the wide area (macro cell) and the local areas (small cells). A wide area has a limited bandwidth, so that spectral efficiency is very important. By contrast with this, a local area makes it easy to take a wide bandwidth, so that, if a wide bandwidth can be secured, the significance of spectral efficiency is not as high as in a wide area. While a wide area needs to support high mobility such as represented by cars and/or the like, a local area has only to support low mobility. A wide area needs to secure wide coverage. On the other hand, although it is preferable to secure wide coverage with a local area as well, a wide area can cover up the shortage of coverage.

Also, although, in a wide area, the uplink-downlink power difference is significant and the uplink and the downlink are asymmetrical, in a local area, the uplink-downlink power difference is insignificant, and the uplink and the downlink are nearly symmetrical. Furthermore, in a wide area, the number of connecting users per cell is high and cell planning is applied, so that there is little variation of traffic. By contrast with this, in a local area, the number of connecting users per cell is low, and furthermore there is a possibility that cell planning is not applied, so that there is significant variation of traffic. In this way, since optimal requirements for a local area are different from those of a wide area, it is necessary to design radio communication schemes that are specifically designed for local areas.

Figure 5:
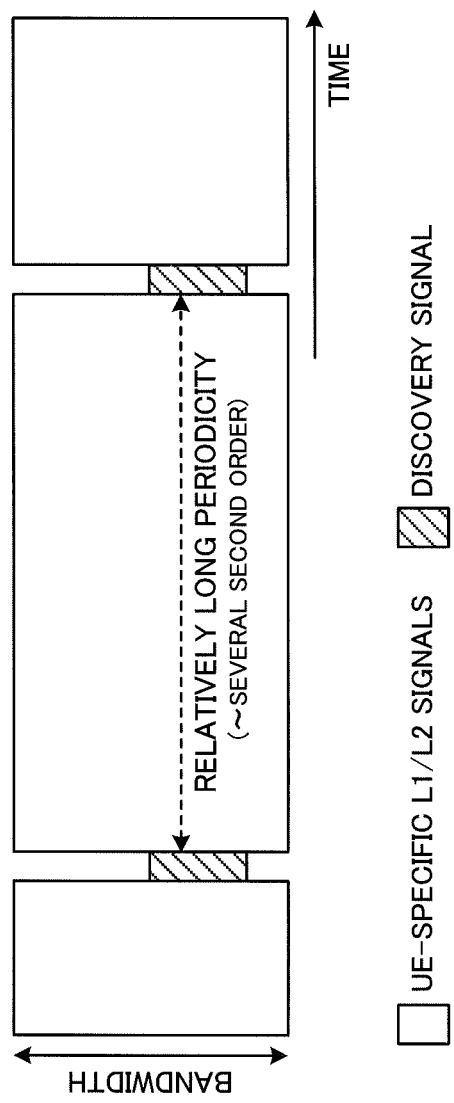
FIG. 5 is a diagram to show a local area radio communication scheme.

Considering interference that arises from saved power consumption and random cell planning, it is preferable to configure a radio communication scheme for local areas to assume non-transmission when there is no traffic. Consequently, as shown in FIG. 5, a radio communication scheme for local areas is expected to be designed as UE-specific as possible. Consequently, a radio communication scheme for local areas is designed based on ePDCCHs (enhanced Physical Downlink Control Channels) and DM-RSs (Demodulation-Reference Signals), without using PSS/SSSs (Primary Synchronization Signal/Secondary Synchronization Signals), CRSs (Cell-specific Reference Signals), PDCCHs (Physical Downlink Control Channels) and so on in LTE.

Here, an ePDCCH refers to a predetermined frequency band that lies within the PDSCH region (data signal region) and that is used as a PDCCH region (control signal region). ePDCCHs allocated in the PDSCH region are demodulated using DM-RSs. Note that an ePDCCH may be referred to as an "FDM-type PDCCH" or may be referred to as a "UE-PDCCH." Also, in a radio communication scheme for local areas, a new carrier that is different from existing carriers is used, and this new carrier may be referred to as an additional carrier or may be referred to as an extension carrier. Note that, in FIG. 5, the PDSCH (Physical Downlink Shared Channel), ePDCCHs, DM-RSs and so on are shown as UE-specific L1/L2 signals.

When everything is designed UE-specific in a radio communication scheme for local areas, a mobile terminal apparatus cannot have the opportunity to make initial access to the local areas. Consequently, in a radio communication scheme for local areas, too, it is necessary to provide cell-specific synchronization signals. The synchronization signals are transmitted in a relatively long cycle on the order of several seconds, so that the mobile terminal apparatus can save battery. The mobile terminal apparatus recognizes the times to receive synchronization signals from each local area by means of control information from the wide area, and measures each local area's received signal power at these times of reception. The mobile terminal apparatus is assigned an adequate local area (transmission point) in accordance with the received signal power of synchronization signals.

Now, with the above HetNet configuration, there is a problem that the wide area and the local area need to coordinate and that the procedures which a mobile terminal apparatus has to take to establish connection with the local area on the uplink are complex. So, the present inventors have arrived at the present invention in order to make initial access on the uplink simple, in a local area that is designed UE-specific. That is, a gist of the present invention is to make initial access simple by providing an uplink channel for reporting synchronization signal measurement results, and establish uplink connection quickly after traffic is produced in a mobile terminal apparatus.

Now, an uplink channel for a local area and an initial connection scheme to use this uplink channel will be described below with reference to FIG. 6 to FIG. 11. Note that, in the following description, in the radio communication scheme for a local area, the synchronization signals for the local area will be referred to as the "discovery signal." Also, in the radio communication scheme for the local area, the uplink channel that is defined for reporting discovery signal measurement results will be referred to as the "DACH" (Direct Access Channel).

Note that the discovery signal may be referred to as, for example, the PDCH (Physical Discovery Channel), the BS (Beacon Signal), the DPS (Discovery Pilot Signal) and so on. Also, the DACH is not limited to a particular name. The radio communication scheme may be referred to as a "radio interface" or may be referred to as a "radio interface scheme." The wide area may be a macro cell, a sector and/or the like. The local area may be a small cell, a pico cell, a nano cell, a femto cell, a micro cell and so on, and may be provided indoors as well as outdoors.

Figure 6:
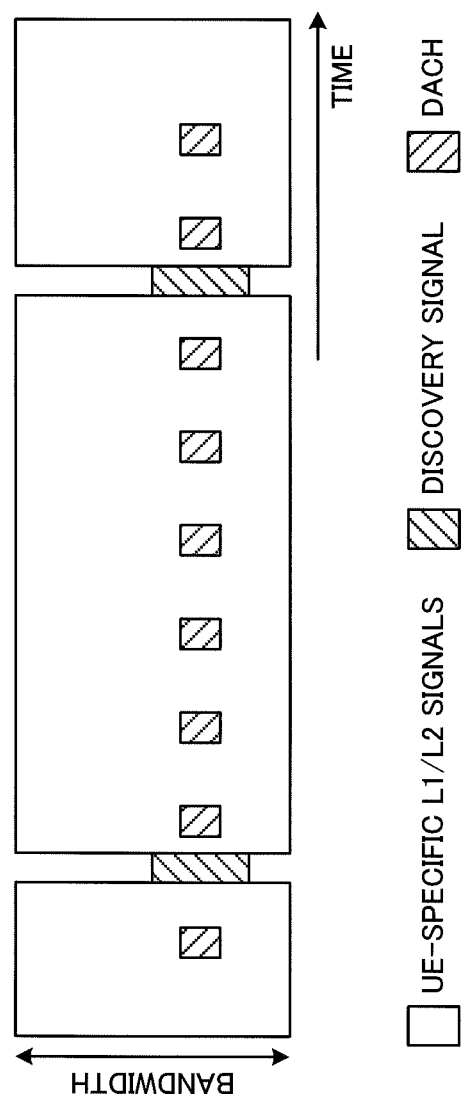
FIG. 6 is a diagram to show a first DACH arrangement configuration.

A first DACH arrangement configuration will be described with reference to FIG. 6. In the radio communication scheme for the local area, discovery signals are transmitted in a long cycle so that a mobile terminal apparatus is able to reduce the number of times of measurement and save battery. In the first DACH arrangement configuration, while downlink discovery signals are transmitted in a long cycle, radio resources are allocated to the uplink DACH with comparatively high frequency (in a short cycle). By means of this DACH used with high frequency, uplink connection is established quickly when traffic is produced in a mobile terminal apparatus. Now, initial connection schemes to use the first DACH arrangement configuration will be described below in detail.

Figure 7:
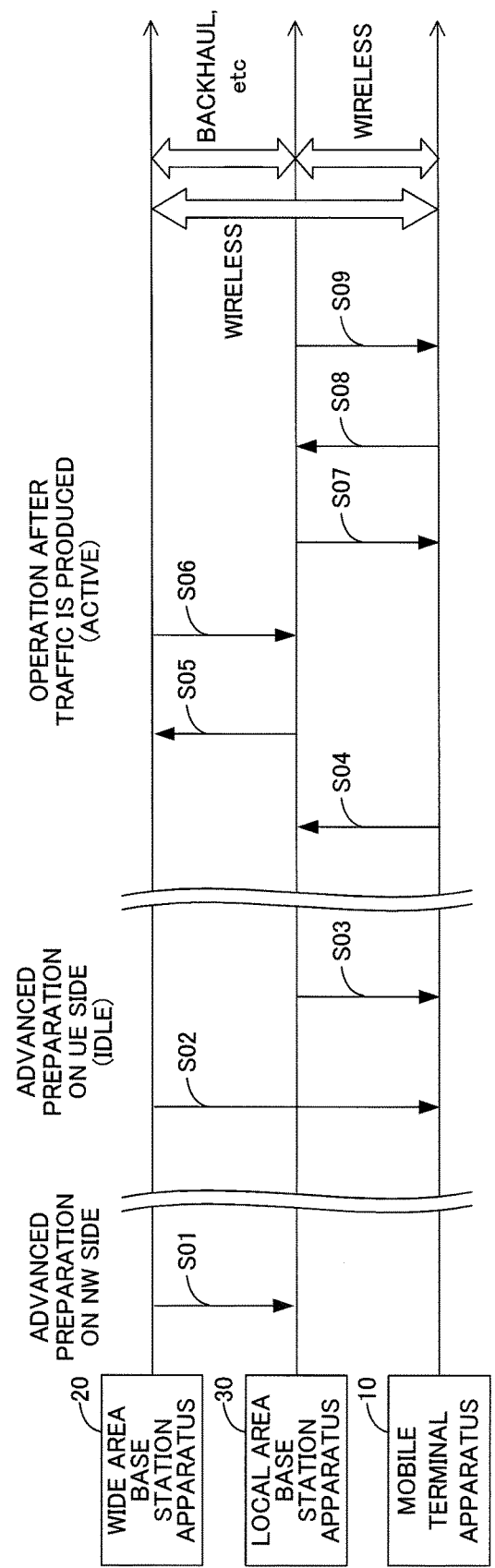
FIG. 7 is a sequence diagram to show a first initial connection scheme using the first DACH arrangement configuration.

An example of the first initial connection scheme using the first DACH arrangement configuration will be described with reference to FIG. 7. Note that, in the following description, a configuration to arrange a plurality of local areas in a wide area will be exemplified (see FIG. 12). As shown in FIG. 7, the wide area base station apparatus 20 and each local area base station apparatus 30 are connected by means of a backhaul link and/or the like (for example, an X2 interface), and the mobile terminal apparatus 10 is able to receive radio signals from the wide area and each local area.

For advanced preparation on the network side, each local area base station apparatus 30 receives control information for discovery signal transmission from the wide area base station apparatus 20, via the backhaul link, and transmits discovery signals periodically (step S01). The control information for discovery signal transmission includes, for example, radio resource information and signal sequence information for transmitting discovery signals to the mobile terminal apparatus 10. Note that the signal sequence of the discovery signal is set for each local area, and the local areas are identified by this signal sequence.

Next, in an idle state, the mobile terminal apparatus 10 receives control information for discovery signal reception, control information for DACH transmission, and control information for ePDCCH reception, from the wide area base station apparatus 20 (step S02). The control information for discovery signal reception includes, for example, radio resource information and signal sequence information for receiving discovery signals from each local area base station apparatus 30. The control information for DACH transmission includes, for example, radio resource information and DM-RS sequence information for transmission to the local area base station apparatus 30 through the DACH. The control information for ePDCCH reception includes, for example, radio resource information and DM-RS sequence information for reception from the local area base station apparatus 30 through ePDCCHs.

The mobile terminal apparatus 10 prepares to receive the discovery signals by means of the control information for discovery signal reception received from the wide area base station apparatus 20. Next, in an idle state, the mobile terminal apparatus 10 receives the discovery signals from each local area base station apparatus 30, and measures the received signal power from each local area base station apparatus 30 periodically (step S03). Then, as traffic is produced in the mobile terminal apparatus 10, the mobile terminal apparatus 10 shifts from an idle state to an active state.

Upon the shift to an active state, the discovery signal measurement results and user IDs of the top several stations among a plurality of local area base station apparatuses 30 are transmitted from the mobile terminal apparatus 10 to the nearest local area base station apparatus 30 through the DACH (step S04). In this case, by means of the control information for DACH transmission received from the wide area base station apparatus 20 in step S02, the mobile terminal apparatus 10 is prepared in advance for transmission using the DACH. Note that the mobile terminal apparatus 10 may determine the nearest local area base station apparatus 30 based on the magnitude of the received signal power of the discovery signals (for example, based on the highest received signal power). Also, the user IDs may be IDs that are randomly selected by the mobile terminal apparatus 10 (for example, RACH-IDs).

Next, the discovery signal measurement results and user IDs of the top several stations, received from the mobile terminal apparatus 10, are transferred from the nearest local area base station apparatus 30 to the wide area base station apparatus 20 (step S05). The wide area base station apparatus 20 assigns an adequate local area base station apparatus to the mobile terminal apparatus 10 based on the discovery signal measurement results of the top several stations, and sets the initial downlink transmission power in the local area base station apparatus 30 (step S06). At this time, the wide area base station apparatus 20 adjusts the load balance between the local areas and assigns the local area base station apparatus 30 to the mobile terminal apparatus 10. Consequently, the mobile terminal apparatus 10 is not necessarily assigned the local area base station apparatus 30 of the highest received signal power. Also, the wide area base station apparatus 20 may be configured to assign a plurality of local area base station apparatuses 30 to the mobile terminal apparatus 10 and carry out CoMP (Coordinated Multiple Point) transmission.

Then, from the assigned local area base station apparatus 30 to the mobile terminal apparatus 10, downlink control signals are transmitted through a control channel (ePDCCH) and user data is transmitted through a data channel (PDSCH) (step S07). In this case, by means of the control information for ePDCCH reception received from the wide area base station apparatus 20 in step S02, the mobile terminal apparatus 10 is prepared in advance for reception using ePDCCHs.

With this first initial connection scheme, discovery signal measurement results are reported to the local area base station apparatus 30 through the DACH that is defined in the radio communication scheme for the local area. Consequently, it is possible to establish uplink connection between the mobile terminal apparatus 10 and the local area base station apparatus 30 without transmitting uplink signals from the mobile terminal apparatus 10 to the wide area base station apparatus 20. Also, since the mobile terminal apparatus 10 measures the discovery signals in an idle state in advance, uplink connection after shift to an active state is made quick. Furthermore, discovery signal measurement results are reported after the mobile terminal apparatus 10 shifts to the active state, so that it is possible to reduce the frequency of reporting and save the battery of the mobile terminal apparatus 10.

Figure 8:
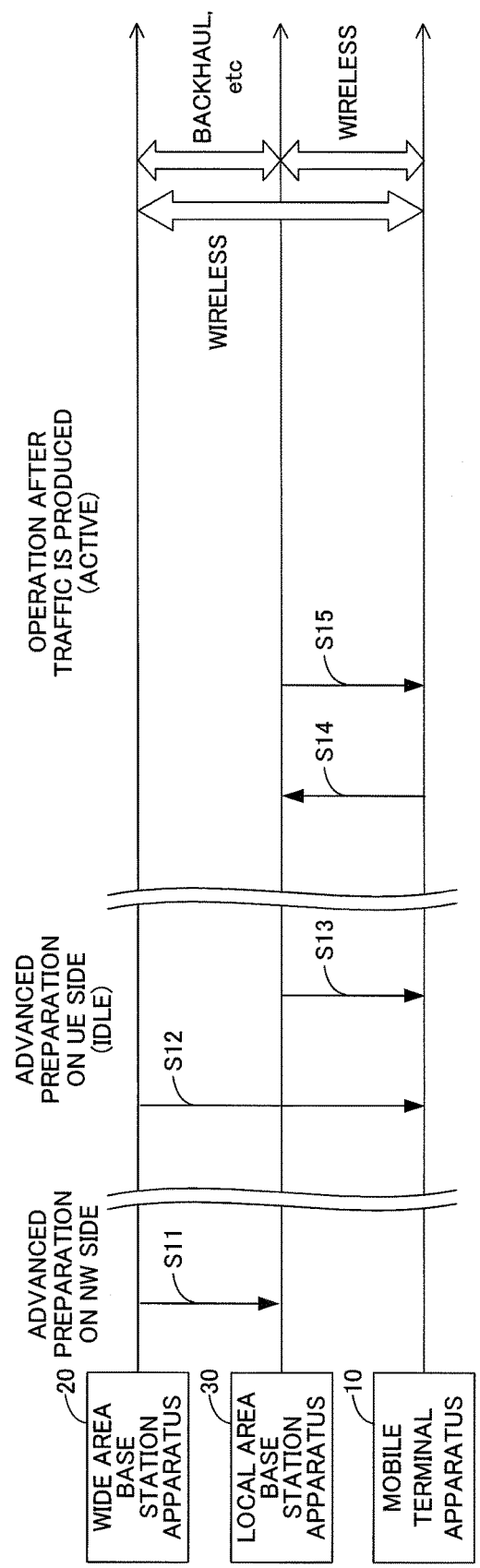
FIG. 8 is a sequence diagram to show a second initial connection scheme using the first DACH arrangement configuration.

An example of a second initial connection scheme using the first DACH arrangement configuration will be described with reference to FIG. 8. In the second initial connection scheme, the assignment process in the wide area base station apparatus 20, in steps S05 and S06 in the first initial connection scheme, is removed. The second initial connection scheme is effective when the volume of traffic produced in the mobile terminal apparatus 10 is small and there is no need to adjust the load balance between the local areas in the wide area base station apparatus 20.

Note that, in the following description, a configuration to arrange a plurality of local areas in a wide area will be exemplified (see FIG. 12). As shown in FIG. 8, the wide area base station apparatus 20 and each local area base station apparatus 30 are connected by means of a backhaul link and/or the like (for example, an X2 interface), and the mobile terminal apparatus 10 is able to receive radio signals from the wide area and each local area.

For advanced preparation on the network side, each local area base station apparatus 30 receives control information for discovery signal transmission from the wide area base station apparatus 20, via the backhaul link, and transmits discovery signals periodically (step S11). The control information for discovery signal transmission includes, for example, radio resource information and signal sequence information for transmitting discovery signals to the mobile terminal apparatus 10. Note that the signal sequence of the discovery signal is set for each local area, and the local areas are identified by this signal sequence.

Next, in an idle state, the mobile terminal apparatus 10 receives control information for discovery signal reception, control information for DACH transmission, and control information for ePDCCH reception, from the wide area base station apparatus 20 (step S12). The control information for discovery signal reception includes, for example, radio resource information and signal sequence information for receiving discovery signals from each local area base station apparatus 30. The control information for DACH transmission includes, for example, radio resource information and DM-RS sequence information for transmission to the local area base station apparatus 30 through the DACH. The control information for ePDCCH reception includes, for example, radio resource information and DM-RS sequence information for reception from the local area base station apparatus 30 through ePDCCHs.

The mobile terminal apparatus 10 prepares to receive the discovery signals by means of the control information for discovery signal reception received from the wide area base station apparatus 20. Next, in an idle state, the mobile terminal apparatus 10 receives the discovery signals from each local area base station apparatus 30, and measures the received signal power from each local area base station apparatus 30 periodically (step S13). Then, as traffic is produced in the mobile terminal apparatus 10, the mobile terminal apparatus 10 shifts from an idle state to an active state.

Upon the shift to an active state, the discovery signal measurement results and user IDs of the top several stations are transmitted from the mobile terminal apparatus 10 to the nearest local area base station apparatus 30 through the DACH (step S14). In this case, by means of the control information for DACH transmission received from the wide area base station apparatus 20 in step S12, the mobile terminal apparatus 10 is prepared in advance for transmission using the DACH. Also, the user IDs may be IDs that are randomly selected by the mobile terminal apparatus 10 (for example, RACH-IDs).

Next, from the nearest local area base station apparatus 30 to the mobile terminal apparatus 10, downlink control signals are transmitted through a control channel (ePDCCH) and user data is transmitted through a data channel (PDSCH) (step S15). In this case, by means of the control information for ePDCCH reception received from the wide area base station apparatus 20 in step S12, the mobile terminal apparatus 10 is prepared in advance for reception using ePDCCHs.

Similar to the first initial connection scheme, with this second initial connection scheme, it is possible to establish uplink connection between the mobile terminal apparatus 10 and the local area base station apparatus 30 without transmitting uplink signals from the mobile terminal apparatus 10 to the wide area base station apparatus 20. Also, the discovery signal measurement results are transmitted to the local area base station apparatus 30, not the wide area base station apparatus 20, so that, even when there are a large number of local areas, load does not concentrate on the wide area base station apparatus 20. Also, uplink connection after shift to an active state is made quick, and furthermore the battery of the mobile terminal apparatus 10 is saved by reducing the frequency of reporting.

Also, the second initial connection scheme and the first initial connection scheme may be configured to be switchable. The first and second initial connection schemes may be switched depending on whether or not to transfer discovery signal measurement results from the nearest (the top) local area base station apparatus 30 to the wide area base station apparatus 20. This switching of the initial connection scheme is determined based on control information from the wide area base station apparatus 20 or control information from the mobile terminal apparatus 10. For example, data size may be included in control information that is transmitted from the mobile terminal apparatus 10 to the nearest local area base station apparatus 30 through the DACH.

Then, the local area base station apparatus 30 switches the initial connection scheme by comparing the data size reported from the mobile terminal apparatus 10 against a threshold value. When the data size is greater than the threshold value, discovery signal measurement results are transferred from the nearest local area base station apparatus 30 to the wide area base station apparatus 20, and the assignment process is carried out in the wide area base station apparatus 20 taking into account the load balance between the local areas. On the other hand, when the data size is lower than the threshold value, the assignment process in the wide area base station apparatus 20 is not carried out, and the nearest local area base station apparatus 30 is assigned to the mobile terminal apparatus 10.

Figure 9:
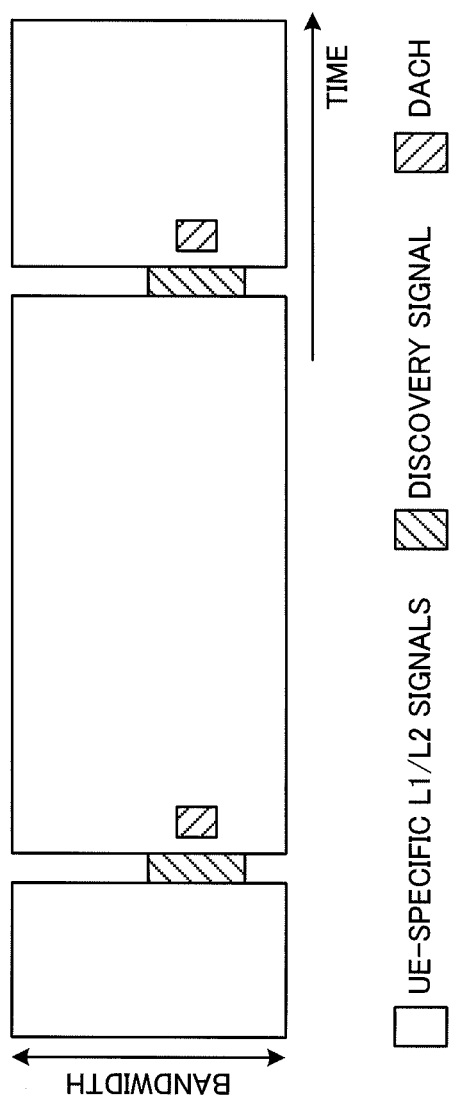
FIG. 9 is a diagram to show a second DACH arrangement configuration.

A second DACH arrangement configuration will be described with reference to FIG. 9. In the second DACH arrangement configuration, downlink discovery signals are transmitted in a long cycle, and radio resources are allocated to the uplink DACH with the same frequency (in a long cycle). By means of this DACH used with low frequency, it is possible to put the monitoring of the DACH in the local area base station apparatus 30 to rest. However, since the frequency of transmitting the DACH is low, with the above-described first and second initial connection schemes, significant delay is produced before uplink connection is established. Now, a third initial connection scheme that is specifically designed for the second DACH arrangement configuration will be described below in detail.

Figure 10:
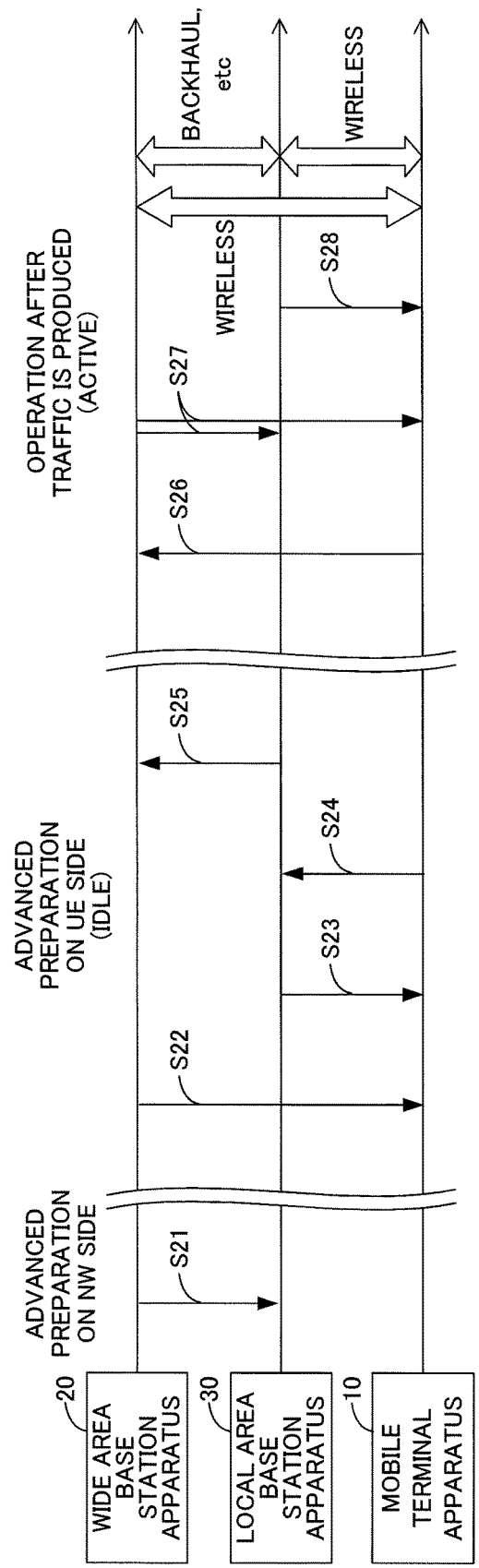
FIG. 10 is sequence diagram to show a third initial connection scheme using the second DACH arrangement configuration.

An example of the third initial connection scheme using the second DACH arrangement configuration will be described with reference to FIG. 10. Note that, in the following description, a configuration to arrange a plurality of local areas in a wide area will be exemplified (see FIG. 12). As shown in FIG. 10, the wide area base station apparatus 20 and each local area base station apparatus 30 are connected by means of a backhaul link and/or the like (for example, an X2 interface), and the mobile terminal apparatus 10 is able to receive radio signals from the wide area and each local area.

For advanced preparation on the network side, each local area base station apparatus 30 receives control information for discovery signal transmission from the wide area base station apparatus 20, via the backhaul link, and transmits discovery signals periodically (step S21). The control information for discovery signal transmission includes, for example, radio resource information and signal sequence information for transmitting discovery signals to the mobile terminal apparatus 10. Note that the signal sequence of the discovery signal is set for each local area, and the local areas are identified by this signal sequence.

Next, in an idle state, the mobile terminal apparatus 10 receives control information for discovery signal reception, control information for DACH transmission, and control information for ePDCCH reception, from the wide area base station apparatus 20 (step S22). The control information for discovery signal reception includes, for example, radio resource information and signal sequence information for receiving discovery signals from each local area base station apparatus 30. The control information for DACH transmission includes, for example, radio resource information and DM-RS sequence information for transmission to the local area base station apparatus 30 through the DACH. The control information for ePDCCH reception includes, for example, radio resource information and DM-RS sequence information for reception from the local area base station apparatus 30 through ePDCCHs.

In this way, the mobile terminal apparatus 10 prepares to receive the discovery signals by means of the control information for discovery signal reception received from the wide area base station apparatus 20. Next, in an idle state, the mobile terminal apparatus 10 receives the discovery signals from each local area base station apparatus 30, and measures the received signal power from each local area base station apparatus 30 periodically (step S23).

Next, the discovery signal measurement results and user IDs of the top several stations among a plurality of local area base station apparatuses 30 are transmitted by the DACH from the mobile terminal apparatus 10 in an idle state to the nearest local area base station apparatus 30 (step S24). In this case, the mobile terminal apparatus 10 is prepared in advance for transmission using the DACH, by means of the control information for DACH transmission, received from the wide area base station apparatus 20 in step S22.

However, if the mobile terminal apparatus 10 transmits the measurement result through the DACH every time the mobile terminal apparatus 10 measures a discovery signal, the battery consumption in the mobile terminal apparatus 10 increases. So, the mobile terminal apparatus 10 may be configured to transmit measurement results through the DACH only when the top several stations change (for example, the top one). Note that the mobile terminal apparatus 10 may determine the nearest local area base station apparatus 30 based on the magnitude of the received signal power of the discovery signals (for example, based on the highest received signal power). Also, the user IDs may be IDs that are randomly selected by the mobile terminal apparatus 10 (for example, RACH-IDs).

Next, the discovery signal measurement results and user IDs of the top several stations, received from the mobile terminal apparatus 10 in an idle state, are transferred from the nearest local area base station apparatus 30 to the wide area base station apparatus 20 (step S25). Then, as traffic is produced in the mobile terminal apparatus 10, the mobile terminal apparatus 10 shifts from an idle state to an active state.

Upon shift to the active state, the mobile terminal apparatus 10 makes random access to the wide area base station apparatus 20 (step S26). The wide area base station apparatus 20 assigns an adequate local area base station apparatus to the mobile terminal apparatus 10 based on the discovery signal measurement results of the top several stations, and commands assignment to the local area base station apparatus 30 and the mobile terminal apparatus 10 (step S27). At this time, by associating the RACH sequences and user IDs with each other in advance, it is possible to use a RACH response for the assignment command to the mobile terminal apparatus 10. Also, by means of the assignment command to the local area base station apparatus 30, initial downlink transmission power is set in the local area base station apparatus 30.

Also, the wide area base station apparatus 20 adjusts the load balance between the local areas and assigns the local area base station apparatus 30 to the mobile terminal apparatus 10. Consequently, the mobile terminal apparatus 10 is not necessarily assigned the local area base station apparatus 30 of the highest received signal power. Also, the wide area base station apparatus 20 may be configured to assign a plurality of local area base station apparatuses 30 to the mobile terminal apparatus 10 and carry out CoMP (Coordinated Multiple Point) transmission.

Then, from the assigned local area base station apparatus 30 to the mobile terminal apparatus 10, downlink control signals are transmitted through a control channel (ePDCCH) and user data is transmitted through a data channel (PDSCH) (step S28). In this case, by means of the control information for ePDCCH reception received from the wide area base station apparatus 20 in step S22, the mobile terminal apparatus 10 is prepared in advance for reception using ePDCCHs.

With this third initial connection scheme, despite the fact that radio resources are allocated to the DACH with low frequency, uplink connection is established quickly when traffic is produced in the mobile terminal apparatus 10. Consequently, it is possible to put the monitoring of the DACH in the local area base station apparatus 30 to rest. Also, by measuring discovery signals in the mobile terminal apparatus 10 in an idle state in advance, uplink connection after shift to the active state is made quick. Furthermore, by lowering the frequency of reporting discovery signal measurement results in an idle state, it is possible to save the battery of the mobile terminal apparatus 10.

Figure 11:
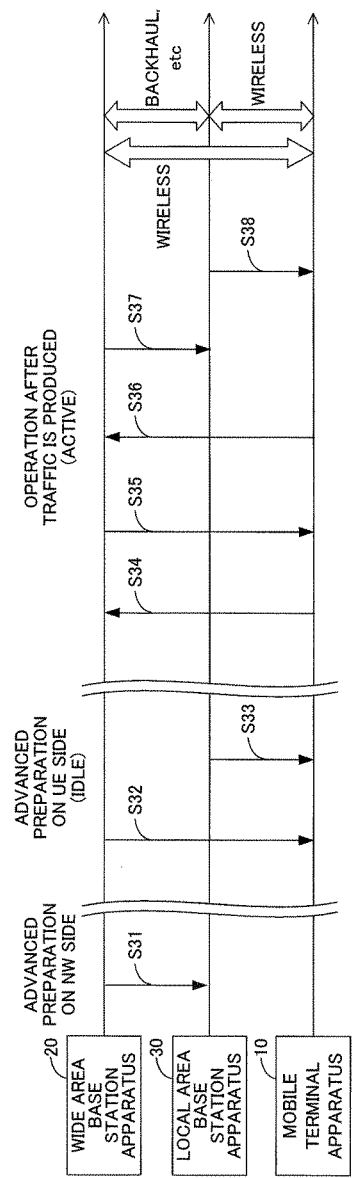
FIG. 11 is a sequence diagram to show a fourth initial connection scheme not using the DACH.

Now, an example of a fourth initial connection scheme not using the DACH will be described with reference to FIG. 11. Note that, in the following description, a configuration to arrange a plurality of local areas in a wide area will be exemplified (see FIG. 12). As shown in FIG. 11, the wide area base station apparatus 20 and each local area base station apparatus 30 are connected by means of a backhaul link and/or the like (for example, an X2 interface), and the mobile terminal apparatus 10 is able to receive radio signals from the wide area and each local area.

For advanced preparation on the network side, each local area base station apparatus 30 receives control information for discovery signal transmission from the wide area base station apparatus 20, via the backhaul link, and transmits discovery signals periodically (step S31). The control information for discovery signal transmission includes, for example, radio resource information and signal sequence information for transmitting discovery signals to the mobile terminal apparatus 10. Note that the signal sequence of the discovery signal is set for each local area, and the local areas are identified by this signal sequence.

Next, in an idle state, the mobile terminal apparatus 10 receives control information for discovery signal reception and control information for ePDCCH reception from the wide area base station apparatus 20 (step S32). The control information for discovery signal reception includes, for example, radio resource information and signal sequence information for receiving discovery signals from each local area base station apparatus 30. The control information for ePDCCH reception includes, for example, radio resource information and DM-RS sequence information for reception from the local area base station apparatus 30 through ePDCCHs.

The mobile terminal apparatus 10 prepares to receive the discovery signals by means of the control information for discovery signal reception received from the wide area base station apparatus 20. Next, in an idle state, the mobile terminal apparatus 10 receives the discovery signals from each local area base station apparatus 30, and measures the received signal power from each local area base station apparatus 30 periodically (step S33). Then, as traffic is produced in the mobile terminal apparatus 10, the mobile terminal apparatus 10 shifts from an idle state to an active state.

Upon shift to the active state, the mobile terminal apparatus 10 makes random access to the wide area base station apparatus 20 (step S34). Next, the wide area base station apparatus 20 commands reporting of the discovery signal measurement results to the mobile terminal apparatus 10 (step S35). Next, from the mobile terminal apparatus 10 to the wide area base station apparatus 20, the discovery signal measurement results of the top several stations are transmitted (step S36).

Next, the wide area base station apparatus 20 assigns an adequate local area base station apparatus to the mobile terminal apparatus 10 based on the discovery signal measurement results of the top several stations, and sets the initial downlink transmission power in the local area base station apparatus 30 (step S37). At this time, the wide area base station apparatus 20 adjusts the load balance between the local areas and assigns the local area base station apparatus 30 to the mobile terminal apparatus 10. Consequently, the mobile terminal apparatus 10 is not necessarily assigned the local area base station apparatus 30 of the highest received signal power. Also, the wide area base station apparatus 20 may be configured to assign a plurality of local area base station apparatuses 30 to the mobile terminal apparatus 10 and carry out CoMP (Coordinated Multiple Point) transmission.

Then, from the assigned local area base station apparatus 30 to the mobile terminal apparatus 10, downlink control signals are transmitted through a control channel (ePDCCH) and user data is transmitted through a data channel (PDSCH) (step S38). In this case, by means of the control information for ePDCCH reception received from the wide area base station apparatus 20 in step S32, the mobile terminal apparatus 10 is prepared in advance for reception using ePDCCHs.

With this fourth initial connection scheme, the DACH is not used on the uplink, and therefore it is necessary to report discovery signal measurement results from the mobile terminal apparatus 10 to the wide area base station apparatus 20. Consequently, compared to the cases of using the DACH with the first to third initial connection schemes, many steps have to be carried out to establish connection after traffic is produced, and therefore it becomes difficult to establish uplink connection quickly.

Note that, although the initial connection schemes described above are each configured to measure the received signal power of discovery signals, this configuration is by no means limiting. With each of the above initial connection schemes, it is equally possible to measure the received quality of discovery signals and determine the local area base station apparatus 30 to connect the mobile terminal apparatus 10 to.

Now, the radio communication system according to the present embodiment will be described in detail. FIG. 12 is a diagram to explain a system configuration of a radio communication system according to the present embodiment. Note that the radio communication system shown in FIG. 12 is a system to accommodate, for example, the LTE system or SUPER 3G. This radio communication system supports carrier aggregation, which groups a plurality of fundamental frequency blocks into one, where the system band of the LTE system is one unit. Also, this radio communication system may be referred to as "IMT-Advanced," or may be referred to as "4G," "FRA" (Future Radio Access) and so on.

Figure 12:
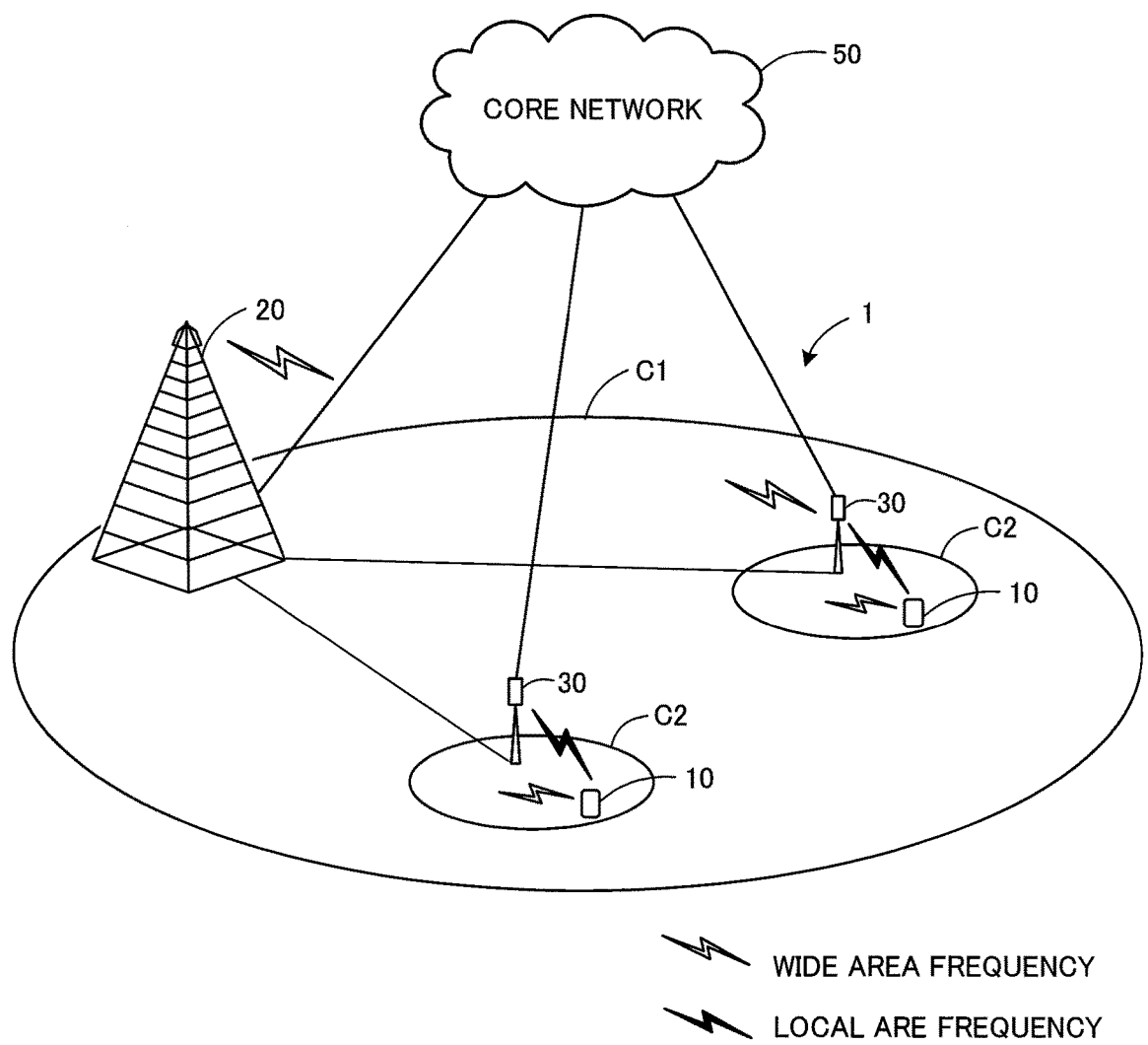
FIG. 12 is a diagram to explain a system configuration of a radio communication system.

As shown in FIG. 12, the radio communication system 1 has a wide area base station apparatus 20 that covers a wide area C1, and a plurality of local area base station apparatuses 30 that cover a plurality of local areas C2 provided inside the wide area C1. Also, in the wide area C1 and each local area C2, many mobile terminal apparatuses 10 are arranged. The mobile terminal apparatuses 10 support the radio communication schemes for the wide area and the local areas, and are configured to be able to perform radio communication with the wide area base station apparatus 20 and the local area base station apparatuses 30.

Communication between the mobile terminal apparatuses 10 and the wide area base station apparatus 20 is carried out using the frequency for the wide area (for example, a low frequency band). Communication between the mobile terminal apparatuses 10 and the local area base station apparatuses 30 is carried out using the frequency for the local areas (for example, a high frequency band). Also, the wide area base station apparatus 20 and each local area base station apparatus 30 are connected with each other by wire connection or by wireless connection.

The wide area base station apparatus 20 and each local area base station apparatus 30 are connected with a higher station apparatus, which is not illustrated, and are connected to a core network 50 via the higher station apparatus. Note that the higher station apparatus may be, for example, an access gateway apparatus, a radio network controller (RNC), a mobility management entity (MME) and so on, but is by no means limited to these. Also, the local area base station apparatuses 30 may be connected with the higher station apparatus via the wide area base station apparatus 20.

Note that, although each mobile terminal apparatus 10 may be either an LTE terminal or an LTE-A terminal, in the following description, simply a mobile terminal apparatus will be described, unless specified otherwise. Also, although the mobile terminal apparatus will be described to perform radio communication with the wide area base station apparatus 20 and the local area base station apparatuses 30 for ease of explanation, more generally, user equipment (UE), including both mobile terminal apparatuses and fixed terminal apparatuses, may be used as well. Also, the local area base station apparatuses 30 and the wide area base station apparatus 20 may be referred to as wide area and local area transmission points. Note that the local area base station apparatuses 30 may be a remote optical base station apparatus.

In the radio communication system, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels in the LTE system will be described. Downlink communication channels include a PDSCH (Physical Downlink Shared Channel), which is used by each mobile terminal apparatus 10 on a shared basis, and downlink L1/L2 control channels (PDCCH, PCFICH, PHICH). User data and higher control information are transmitted by the PDSCH. Scheduling information and so on for the PDSCH and the PUSCH are transmitted by the PDCCH (Physical Downlink Control Channel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

Uplink communication channels include a PUSCH (Physical Uplink Shared Channel), which is used by each mobile terminal apparatus 10 on a shared basis as an uplink data channel, and a PUCCH (Physical Uplink Control Channel), which is an uplink control channel. User data and higher control information are transmitted by this PUSCH. Also, downlink radio quality information (CQI: Channel Quality Indicator), ACK/NACK and so on are transmitted by the PUCCH.

Figure 13:
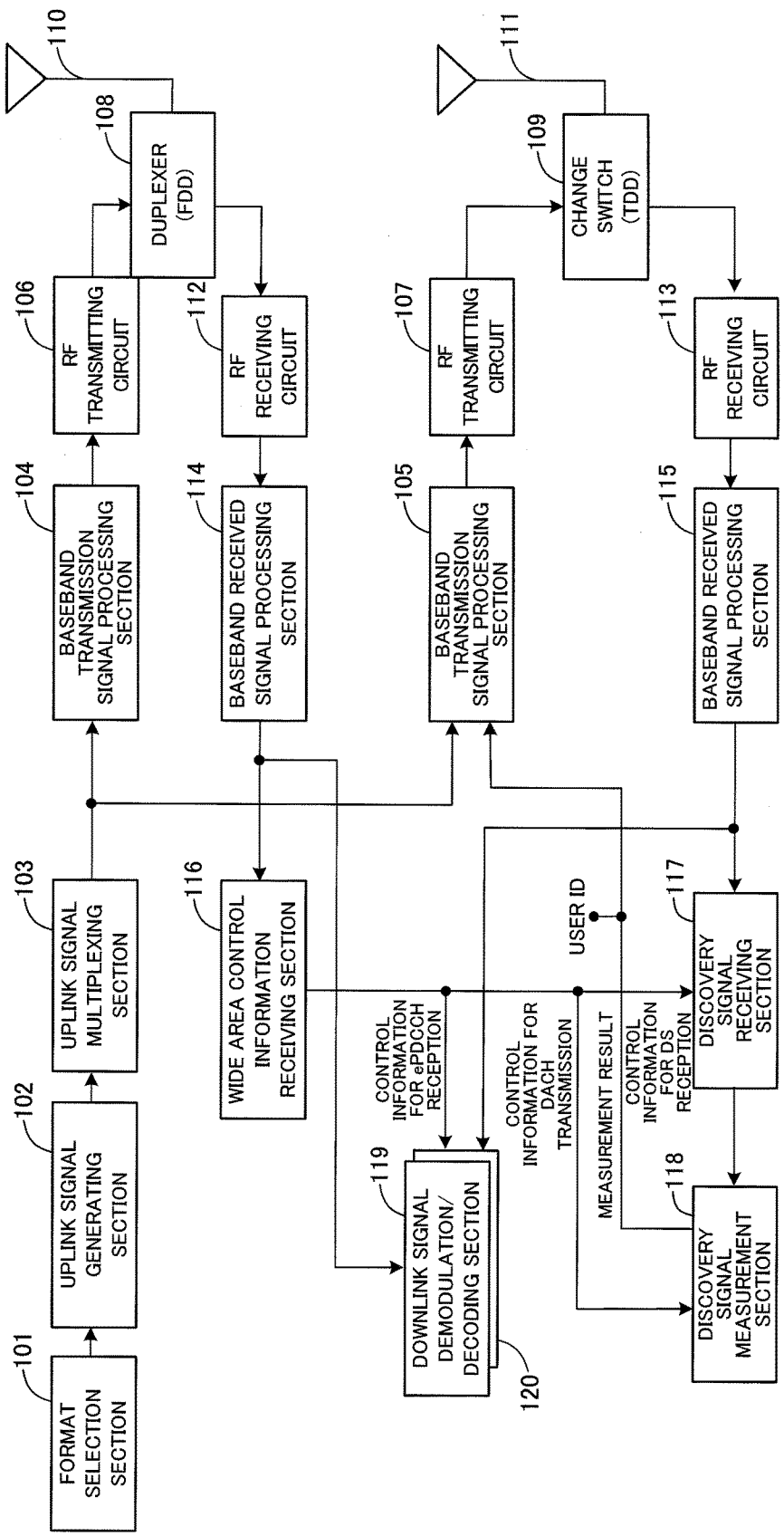
FIG. 13 is a diagram to show an overall configuration of a mobile terminal apparatus.

An overall configuration of the mobile terminal apparatuses 10 will be described with reference to FIG. 13. The mobile terminal apparatus 10 has, as processing sections of the transmitting sequence, a format selection section 101, an uplink signal generating section 102, an uplink signal multiplexing section 103, baseband transmission signal processing sections 104 and 105, and RF transmitting circuits 106 and 107.

The format selection section 101 selects the transmission format for the wide area and the transmission format for the local areas. The uplink signal generating section 102 generates uplink data signals and reference signals. In the event of the transmission format for the wide area, the uplink signal generating section 102 generates the uplink data signal and reference signal for the wide area base station apparatus 20. Also, in the event of the transmission format for the local areas, the uplink signal generating section 102 generates the uplink data signal and reference signal for the local area base station apparatus 30.

The uplink signal multiplexing section 103 multiplexes the uplink transmission data and the reference signal. An uplink signal for the wide area base station apparatus 20 is input in the baseband transmission signal processing section 104, and subjected to digital signal processing. For example, in the event of an uplink signal of the OFDM scheme, the signal is converted from a frequency domain signal into a time sequence signal through an inverse fast Fourier transform (IFFT), and has cyclic prefixes inserted therein. Then, the uplink signal passes the RF transmitting circuit 106, and is transmitted from a transmitting/receiving antenna 110 for the wide area, via a duplexer 108 that is provided between the transmitting sequence and the receiving sequence. In the transmitting/receiving sequences for the wide area, simultaneous transmission/reception is made possible by the duplexer 108.

An uplink signal for the local area base station apparatus 30 is input in the baseband transmission signal processing section 105, and subjected to digital signal processing. For example, in the event of an uplink signal of the OFDM scheme, the signal is converted from a frequency domain signal into a time sequence signal through an inverse fast Fourier transform (IFFT), and has cyclic prefixes inserted therein. Then, the uplink signal passes the RF transmitting circuit 107, and is transmitted from a transmitting/receiving antenna 111 for the wide area, via a change switch 109 that is provided between the transmitting sequence and the receiving sequence. In the transmitting/receiving sequences for the local areas, transmission and reception are switched by a change switch 109.

Note that, although the present embodiment is configured to provide the duplexer 108 in the transmitting/receiving sequences for the wide area and provide the change switch 109 in the transmitting/receiving sequences for the local areas, this configuration is by no means limiting. It is equally possible to provide the change switch 109 in the wide area transmitting/receiving sequence and provide the duplexer 108 in the local area transmitting/receiving sequence. Also, uplink signals for the wide area and the local areas may be transmitted simultaneously from the transmitting/receiving antennas 110 and 111, or may be transmitted separately by switching between the transmitting/receiving antennas 110 and 111.

Also, the mobile terminal apparatus 10 has, as processing sections of the receiving sequence, RF receiving circuits 112 and 113, baseband received signal processing sections 114 and 115, a wide area control information receiving section 116, a discovery signal receiving section 117, a discovery signal measurement section 118, and downlink signal demodulation/decoding sections 119 and 120.

A downlink signal from the wide area base station apparatus 20 is received at the wide area transmitting/receiving antenna 110. This downlink signal is input in the baseband received signal processing section 114 via the duplexer 108 and the RF receiving circuit 112, and subjected to digital signal processing. For example, in the event of a downlink signal of the OFDM scheme, the cyclic prefixes are removed, and the signal is converted from a time sequence signal to a frequency domain signal through a fast Fourier transform (FFT).

The wide area control information receiving section 116 receives wide area control information from the downlink signal for the wide area. Here, as the wide area control information, control information for discovery signal reception, control information for DACH transmission, and control information for ePDCCH reception are received. The wide area control information receiving section 116 outputs the control information for discovery signal reception to the discovery signal receiving section 117, outputs the control information for DACH transmission to the discovery signal measurement section 118, and outputs the control information for ePDCCH reception to the downlink signal demodulation/decoding section 120. Note that the wide area control information is received by means of, for example, broadcast information, RRC signaling (higher layer signaling) and so on. The downlink data signal for the wide area is input in the downlink signal demodulation/decoding section 119, and decoded (descrambled) and demodulated in the downlink signal demodulation/decoding section 119.

A downlink signal from the local area base station apparatus 30 is received in the transmitting/receiving antenna 111 for the local areas. This downlink signal is input in the baseband received signal processing section 115 via the change switch 109 and the RF receiving circuit 113, and is subjected to digital signal processing. For example, in the event of a downlink signal of the OFDM scheme, the cyclic prefixes are removed, and the signal is converted from a time sequence signal to a frequency domain signal through a fast Fourier transform (FFT).

The discovery signal receiving section 117 receives the discovery signal from the local area base station apparatus 30 based on the control information for discovery signal reception input from the wide area control information receiving section 116. The control information for discovery signal reception includes, for example, radio resource information and signal sequence information for receiving discovery signals from each local area base station apparatus 30. The radio resource information includes, for example, the transmission interval, the frequency position, and the code of the discovery signals.

The discovery signal measurement section 118 periodically measures the received signal power of the discovery signals received in the discovery signal receiving section 117. Among the discovery signals from each local area base station apparatus 30, the discovery signal measurement section 118 transmits the measurement results of the top several stations (for example, the top three stations) where the received signal power is high, to the local area base station apparatus 30 by means of the DACH. In this case, the discovery signal measurement section 118 specifies the local area of the transmission destination based on the signal sequences of discovery signals. Also, in the event of the first DACH arrangement configuration (the first and second initial connection schemes), the DACH is set with higher frequency than the discovery signals. Then, upon shift from an idle state to an active state, the discovery signal measurement results are transmitted to the local area base station apparatus 30.

In the second DACH arrangement configuration (the third initial connection scheme), the DACH is set with the same frequency as that of discovery signals. Then, in the idle state, the discovery signal measurement results are transmitted to the local area base station apparatus 30. With the second DACH arrangement configuration, discovery signal measurement results are transmitted through the DACH only when the received signal power of the top several stations (for example, the top one) changes, taking into account the amount of battery consumption in the mobile terminal apparatus 10, Also, in the DACH, user IDs are transmitted with the discovery signal measurement results.

Note that transmission by means of the DACH is carried out based on the control information for DACH transmission input from the wide area control information receiving section 116. The control information for DACH transmission includes, for example, radio resource information and DM-RS sequence information for transmission to the local area base station apparatus 30 by means of the DACH. The radio resource information includes, for example, the transmission interval, the frequency position, and the code of the DACH.

A downlink data signal for the local areas is input in a downlink signal demodulation/decoding section 120, and decoded (descrambled) and demodulated in the downlink signal demodulation/decoding section 120. Also, based on the control information for ePDCCH reception input from the wide area control information receiving section 116, the downlink signal demodulation/decoding section 120 decodes (descrambles) and demodulates the local area downlink control signal (ePDCCH). The control information for ePDCCH reception includes, for example, radio resource information and DM-RS sequence information for reception from the local area base station apparatus 30 by means of ePDCCHs. The radio resource information includes, for example, the transmission interval, the frequency position, and the code of ePDCCHs.

Also, downlink signals for the wide area and the local areas may be received simultaneously from the transmitting/receiving antennas 110 and 111, or may be received separately by switching between the transmitting/receiving antennas 110 and 111. Note that, in the event of the third initial connection scheme, a signal generating section may be provided so as to allow the mobile terminal apparatus 10 to make random access to the wide area base station apparatus 20. This signal generating section may, for example, generate RACH sequences in association with user IDs.

Figure 14:
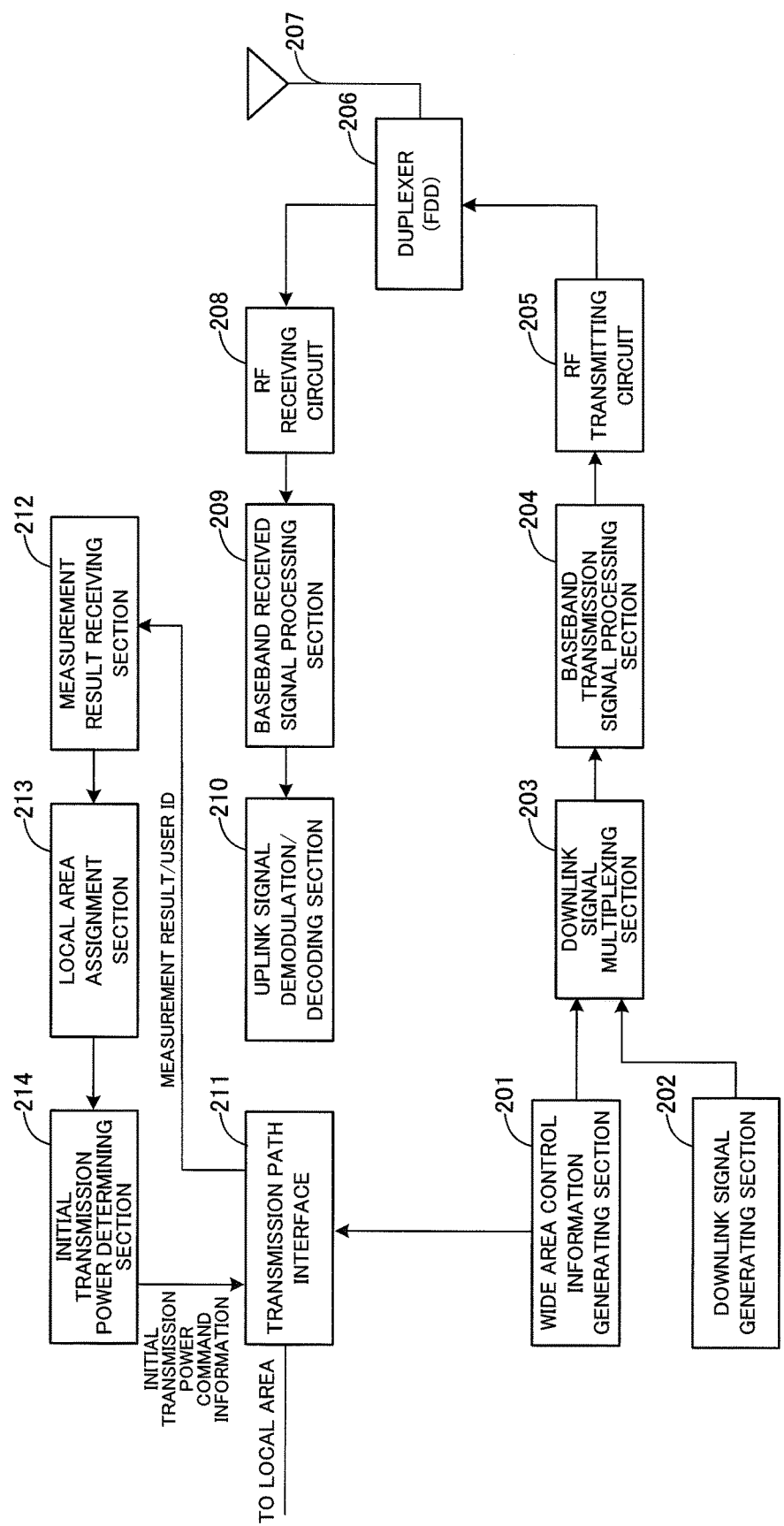
FIG. 14 is a diagram to show an overall configuration of a wide area base station apparatus.

An overall configuration of the wide area base station apparatus 20 will be described with reference to FIG. 14. The wide area base station apparatus 20 has, as processing sections of the transmitting sequence, a wide area control information generating section 201, a downlink signal generating section 202, a downlink signal multiplexing section 203, a baseband transmission signal processing section 204, and an RF transmitting circuit 205.

The wide area control information generating section 201 generates, as wide area control information, control information for discovery signal transmission, control information for discovery signal reception, control information for DACH transmission, and control information for ePDCCH reception. The wide area control information generating section 201 outputs the control information for discovery signal transmission to a transmission path interface 211, and outputs the control information for discovery signal reception, the control information for DACH transmission, and the control information for ePDCCH reception to the downlink signal multiplexing section 203. The control information for discovery signal transmission is transmitted to the local area base station apparatus 30 via the transmission path interface 211. Meanwhile, the control information for discovery signal reception, the control information for DACH transmission, and the control information for ePDCCH reception are transmitted to the mobile terminal apparatus 10 via the downlink signal multiplexing section 203.

The downlink signal generating section 202 generates downlink data signals and reference signals. The downlink signal multiplexing section 203 multiplexes the wide area control information, the downlink data signal and the reference signal. A downlink signal for the mobile terminal apparatus 10 is input in the baseband transmission signal processing section 204, and subjected to digital signal processing. For example, in the event of a downlink signal of the OFDM scheme, the signal is converted from a frequency domain signal to a time sequence signal through an inverse fast Fourier transform (IFFT), and has cyclic prefixes inserted therein. Then, the downlink signal passes the RF transmitting circuit 205, and is transmitted from the transmitting/receiving antenna 207 via a duplexer 206 that is provided between the transmitting sequence and the receiving sequence.

Also, the wide area base station apparatus 20 has, as processing sections of the receiving sequence, an RF receiving circuit 208, a baseband received signal processing section 209, an uplink signal demodulation/decoding section 210, a measurement result receiving section 212, a local area assignment section 213, and an initial transmission power determining section 214.

An uplink signal from the mobile terminal apparatus 10 is received in the transmitting/receiving antenna 207, and is input in the baseband received signal processing section 209 via the duplexer 206 and the RF receiving circuit 208. In the baseband received signal processing section 209, the uplink signal is subjected to digital signal processing. For example, in the event of an uplink signal of the OFDM scheme, the cyclic prefixes are removed, and the signal is converted from a time sequence signal to a frequency domain signal through a fast Fourier transform (FFT). The uplink data signal is input in the uplink signal demodulation/decoding section 210, and decoded (descrambled) and demodulated in the uplink signal demodulation/decoding section 210.

The measurement result receiving section 212 receives the discovery signal measurement results and user IDs transferred from the local area base station apparatus 30, via the transmission path interface 211. The measurement result receiving section 212 outputs the discovery signal measurement results and user IDs to the local area assignment section 213. Based on the received signal power and the user IDs of the top several stations shown by the discovery signal measurement results, the local area assignment section 213 assigns an adequate local area base station apparatus 30 to the mobile terminal apparatus 10. At this time, the local area assignment section 213 performs the assignment by adjusting the load balance between the local areas.

The initial transmission power determining section 214 determines the initial transmission power (ePDCCH/PDSCH) for the local area base station apparatus 30 based on the discovery signal measurement results (received signal power). The initial transmission power determining section 214 transmits, via the transmission path interface 211, initial transmission power command information to the local area base station apparatus 30 to which the mobile terminal apparatus 10 will connect.

Note that, with the second initial connection scheme, discovery signal measurement results are not transferred from the local area base station apparatus 30, so that the process of assigning a local area and the process of determining initial transmission power are stopped. Also, with the third initial connection scheme, it is possible to indicate the assignment result to the mobile terminal apparatus 10 using an RACH response, by associating user IDs with RACH sequences.

Figure 15:
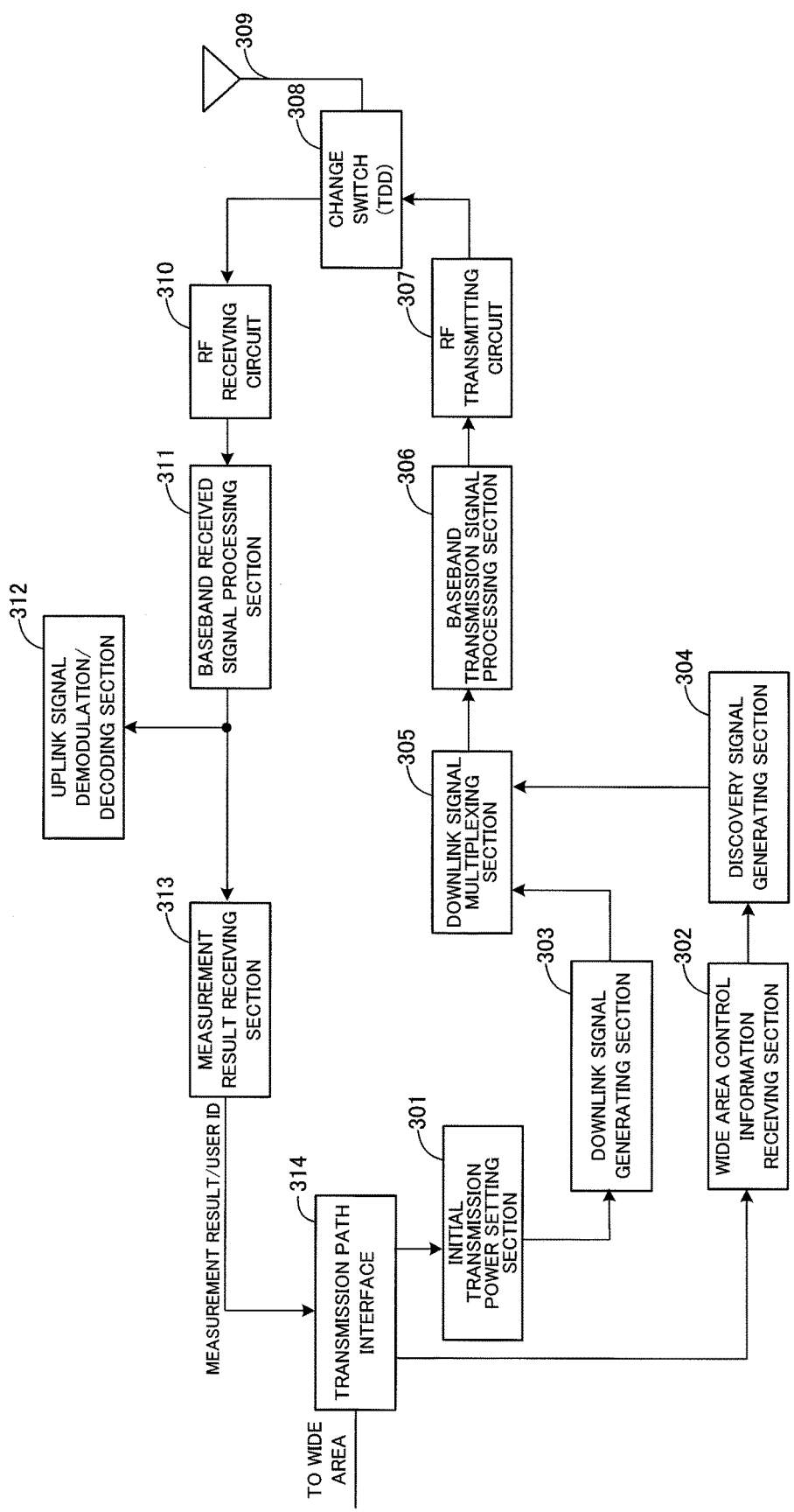
FIG. 15 is a diagram show an overall configuration of a local area base station apparatus.

An overall configuration of the local area base station apparatus 30 will be described with reference to FIG. 15. Assume that the local area base station apparatus 30 is arranged very close to the mobile terminal apparatus 10. The local area base station apparatus 30 has an initial transmission power setting section 301 and a wide area control information receiving section 302. Also, the local area base station apparatus 30 has, as processing sections of the transmitting sequence, a downlink signal generating section 303, a discovery signal generating section 304, a downlink signal multiplexing section 305, a baseband transmission signal processing section 306, and an RF transmitting circuit 307.

The initial transmission power setting section 301 receives initial transmission power command information from the wide area base station apparatus 20 via the transmission path interface 314. The initial transmission power setting section 301 sets the initial transmission power of the downlink data signal (PDSCH) and the downlink control signal (ePDCCH) based on the initial transmission power command information. The wide area control information receiving section 302 receives wide area control information from the wide area base station apparatus 20 via a transmission path interface 314. Here, as the wide area control information, the control information for discovery signal transmission is received. The wide area control information receiving section 302 outputs the control information for discovery signal transmission to the discovery signal generating section 304.

The downlink signal generating section 303 generates a downlink data signal (PDSCH), a reference signal, and a downlink control signal (ePDCCH). In the downlink signal generating section 303, the initial transmission power of the downlink data signal and the downlink control signal is set by the initial transmission power setting section 301. The discovery signal generating section 304 generates the discovery signal based on the control information for discovery signal transmission input from the wide area control information receiving section 302. The control information for discovery signal transmission includes, for example, radio resource information and signal sequence information for transmitting discovery signals to the mobile terminal apparatus 10. The radio resource information includes, for example, the transmission interval, the frequency position, and the code of the discovery signals.

The downlink signal multiplexing section 305 multiplexes the downlink transmission data, the reference signal and the downlink control signal. A downlink signal for the mobile terminal apparatus 10 is input in the baseband transmission signal processing section 306, and subjected to digital signal processing. For example, in the event of a downlink signal of the OFDM scheme, the signal is converted from a frequency domain signal to a time sequence signal through an inverse fast Fourier transform (IFFT), and has cyclic prefixes inserted therein. Then, the downlink signal passes the RF transmitting circuit 307, and is transmitted from a transmitting/receiving antenna 309 via the change switch 308 that is provided between the transmitting sequence and the receiving sequence. Note that a duplexer may be provided instead of the change switch 308.

The local area base station apparatus 30 has, as processing sections of the receiving sequence, an RF receiving circuit 310, a baseband received signal processing section 311, an uplink signal demodulation/decoding section 312, and a measurement result receiving section 313.

An uplink signal from the mobile terminal apparatus 10 is received in the transmitting/receiving antenna 309 for the local areas, and input in the baseband received signal processing section 311 via the change switch 308 and the RF receiving circuit 310. In the baseband received signal processing section 311, the uplink signal is subjected to digital signal processing. For example, in the event of an uplink signal of the OFDM scheme, the cyclic prefixes are removed, and the signal is converted from a time sequence signal to a frequency domain signal through a fast Fourier transform (FFT). The uplink data signal is input in the uplink signal demodulation/decoding section 312, and decoded (descrambled) and demodulated in the uplink signal demodulation/decoding section 312.

The measurement result receiving section 313 receives the discovery signal measurement results and user IDs from the uplink signal. In the event of the first and third initial connection schemes, the measurement result receiving section 313 transfers the discovery signal measurement results and user IDs to the wide area base station apparatus 20 via the transmission path interface 314. In the event of the second initial connection scheme, the measurement result receiving section 313 does not transfer the discovery signal measurement results and user IDs to the wide area base station apparatus 20. Note that, in the second connection scheme, the transfer of discovery signal measurement results and user IDs to the wide area base station apparatus 20 may be switched based on control information transmitted from the wide area or based on control information transmitted through the DACH. For example, the size of data that is produced in the mobile terminal apparatus 10 may be included in the control information.

Then, if the data size is large, the discovery signal measurement results and user IDs are transferred to the wide area base station apparatus 20, and the wide area base station apparatus 20 carries out the assignment process taking into account the load balance between the local areas. When the data size is small, the discovery signal measurement results and user IDs are not transferred to the wide area base station apparatus 20, and the local area base station apparatus 30 having received the discovery signal measurement results is assigned to the mobile terminal apparatus 10.

As described above, with the radio communication system 1 according to the present embodiment, discovery signal measurement results are reported to the local area base station apparatus 30 quickly using the PDCH defined in the radio communication scheme for the local area. Consequently, when traffic is produced in the mobile terminal apparatus 10, subsequent uplink initial connection can be made smoothly. As a result, it is possible to provide highly efficient local area radio access specifically designed for local areas.

The present invention is by no means limited to the above embodiment and can be implemented in various modifications. For example, without departing from the scope of the present invention, it is possible to adequately change the number of carriers, the bandwidth of carriers, the signaling method, the number of processing sections, and the order of processing steps in the above description, and implement the present invention. Besides, the present invention can be implemented with various changes, without departing from the scope of the present invention.

The disclosure of Japanese Patent Application No. 2012-087585, filed on Apr. 6, 2012, including the specification, drawings and abstract, is incorporated herein by reference in its entirety.

The invention claimed is:

1. A mobile terminal apparatus that is able to communicate with a first base station apparatus and/or a second base station apparatus, the mobile terminal apparatus comprising:
    a receiving circuit that receives a discovery signal from the second base station apparatus; and
    a transmission circuit that, when the mobile terminal apparatus is in an idle state or before the mobile terminal apparatus shifts to an active state, transmits at least a user ID which is an identifier (ID) of the mobile terminal apparatus to the second base station apparatus, based on a reception result of the discovery signal, using an access channel for the second base station apparatus,
    wherein, when the mobile terminal apparatus shifts to the active state, the transmission circuit transmits a random access channel (RACH) sequence associated with the user ID to the first base station apparatus, and
    wherein the receiving circuit receives, from the first base station apparatus responding to the RACH sequence, a RACH response including an assignment indication which indicates the second base station apparatus is assigned to the mobile terminal apparatus by the first base station apparatus, and receives a data channel from the second base station apparatus.

2. The mobile terminal apparatus according to claim 1, wherein the receiving circuit receives control information for reception of the discovery signal from the first base station apparatus and uses the control information as a basis to receive the discovery signal from the second base station apparatus.

3. The mobile terminal apparatus according to claim 2, wherein the receiving circuit receives control information for transmission of the access channel from the first base station apparatus, and the transmission circuit uses the control information as a basis to transmit at least the user ID to the second base station apparatus using the access channel.

4. The mobile terminal apparatus according to claim 2, wherein the transmission circuit transmits a measurement result of the discovery signal as well as the user ID using the access channel to the second base station apparatus.

5. The mobile terminal apparatus according to claim 2, wherein a radio resource for the access channel is allocated at a same frequency as a radio resource for reception of the discovery signal.

6. The mobile terminal apparatus according to claim 1, wherein the receiving circuit receives control information for transmission of the access channel from the first base station apparatus, and the transmission circuit uses the control information as a basis to transmit at least the user ID to the second base station apparatus using the access channel.

7. The mobile terminal apparatus according to claim 6, wherein the transmission circuit transmits a measurement result of the discovery signal as well as the user ID using the access channel to the second base station apparatus.

8. The mobile terminal apparatus according to claim 6, wherein a radio resource for the access channel is allocated at a same frequency as a radio resource for reception of the discovery signal.

9. The mobile terminal apparatus according to claim 1, wherein the transmission circuit transmits a measurement result of the discovery signal as well as the user ID using the access channel to the second base station apparatus.

10. The mobile terminal apparatus according to claim 9, wherein a radio resource for the access channel is allocated at a same frequency as a radio resource for reception of the discovery signal.

11. The mobile terminal apparatus according to claim 1, wherein a radio resource for the access channel is allocated at a same frequency as a radio resource for reception of the discovery signal.

12. A second base station apparatus that connects with a first base station apparatus, the second base station apparatus comprising:
    a transmission circuit that transmits a discovery signal to be used to detect the second base station apparatus by a mobile terminal apparatus; and
    a receiving circuit that, when the mobile terminal apparatus is in an idle state or before the mobile terminal apparatus shirts to an active state, receives at least a user ID which is an identifier (ID) of the mobile terminal apparatus,
    wherein the user ID is transmitted using an access channel for the second base station based on a reception result of the discovery signal from the mobile terminal apparatus, and
    when the mobile terminal apparatus shifts to the active state, a random access channel (RACH) sequence associated with the user ID is transmitted to the first base station apparatus, and
    wherein the mobile terminal apparatus receives, from the first base station apparatus responding to the RACH sequence, a RACH response including an assignment indication which indicates the second base station apparatus is assigned to the mobile terminal apparatus by the first base station apparatus, and receives a data channel from the second base station apparatus.

13. The second base station apparatus according to claim 12, further comprising a transmission path interface that receives control information for transmission of the discovery signal, from the first base station apparatus, and wherein the transmission circuit transmits the discovery signal based on the control information.

14. The second base station apparatus according to claim 13, wherein
    the transmission path interface transmits at least the user ID received from the mobile terminal apparatus in the idle state or before the active state, to the first base station apparatus, and receives, when the second base station apparatus is assigned for the mobile terminal apparatus by the first base station apparatus responding to the RACH sequence, a transmission instruction of a data channel from the first base station apparatus to the mobile terminal apparatus, and
    the transmission circuit transmits the data channel to the mobile terminal apparatus based on the transmission instruction.

15. A communication method for a first base station apparatus and/or a second base station apparatus and for a mobile terminal apparatus, the communication method comprising the steps of:
    in the mobile terminal apparatus,
    receiving a discovery signal to be used to detect the second base station apparatus from the second base station apparatus;
    when the mobile terminal apparatus is in an idle state or before the mobile terminal apparatus shifts to an active state, transmitting at least a user ID which is an identifier (ID) of the mobile terminal apparatus to the second base station apparatus, based on a reception result of the discovery signal, using an access channel for the second base station apparatus, and
    when the mobile terminal apparatus shifts to the active state, transmitting a random access channel (RACH) sequence associated with the user ID to the first base station apparatus, and
    receiving, from the first base station apparatus responding to the RACH sequence, a RACH response including an assignment indication which indicates the second base station apparatus assigned for the mobile terminal apparatus by the first base station apparatus, and receives a data channel from the second base station apparatus.

* * * * *